US008390448B2

(12) United States Patent
Weinstein

(10) Patent No.: US 8,390,448 B2

(45) Date of Patent: *Mar. 5, 2013

(54) APPARATUS AND METHOD FOR ELECTRONIC DETECTION OF KEY INSERTION AND REMOVAL

(76) Inventor: Hillel Weinstein, Tel-Aviv (IL)

( * ) Notice: Subject to any disclaimer, the term of this patent is extended or adjusted under 35 U.S.C. 154(b) by 4 days.

This patent is subject to a terminal disclaimer.

(21) Appl. No.: 13/028,229

(22) Filed: Feb. 16, 2011

(65) Prior Publication Data

US 2012/0207265 A1 Aug. 16, 2012

(51) Int. Cl.
*G05B 19/00* (2006.01)
*G06F 7/02* (2006.01)

(52) U.S. Cl. ....... 340/540; 340/5.6; 340/5.65; 340/5.67; 340/407.1; 340/407.2; 70/278.2; 70/283.1

(58) Field of Classification Search .......... 340/657–689, 340/568.1, 540, 5.1, 5.6, 5.65, 5.67, 5.74, 340/426.1, 542, 10.2, 425.5, 429, 426.3, 340/426.28, 426.36, 426.11, 426.16, 989, 340/541, 5.72, 825.19, 825.72, 158, 407.1–407.2; 700/186–193; 377/13–19, 20, 23, 26, 39, 377/43; 702/85–107; 70/278.2, 283.1
See application file for complete search history.

(56) References Cited

U.S. PATENT DOCUMENTS 4,440,011 A 4/1984 Klein
5,025,426 A * 6/1991 Blumberg et al. .............. 368/10
6,255,957 B1 * 7/2001 Sonderegger et al. ..... 340/686.1
7,397,341 B2 * 7/2008 Bhat et al. ...................... 340/5.1
2009/0201151 A1 8/2009 De Levie et al.
2009/0293567 A1 * 12/2009 Yuen et al. ...................... 70/391

OTHER PUBLICATIONS

Freescale Semiconductor. (2007). Implementing Positioning Algorithms Using Accelerometers. (AN3397). Seifert, K and Camacho, O. Retrieved May 16, 2011, from http://liveweb.web.archive.org/http://www.freescale.com/files/sensors/doc/app_note/AN3397.pdf?WT_TYPE=Application%20Notes&WT_VENDOR=FREESCALE&WT_FILE_FORMAT=pdf&WT_A. All pages pertinent.*

Freescale Semiconductor. (2008). The MMA745xL Digital Accelerometer. (AN3468). Tempe, Az: Tuck, K. U continued: Retrieved May 18, 2011, from http://www.soustar.com.cn/download/pdf/MMA7455L%E4%B8%89%E8%BD%B4%E5%8A%A0%E9%80%9F%E5%BA%A6%E4%BC%A0%E6%84%9F%E5%99%A8%E5%BA%94%E7%94%A8%E7%AC%94%E8%AE%B01%EF%BC%88AN3468%EF%BC%89.pdf. All pages pertinent.*

* cited by examiner

*Primary Examiner* — Daniel Wu
*Assistant Examiner* — John Bamert
(74) *Attorney, Agent, or Firm* — Soroker Agmon

(57) ABSTRACT

An apparatus for detecting a key insertion into a lock or a key removal from the lock, comprising: a movement sensing device attached to the key configured to sense movement of the key; and a processing unit configured to process signals received from said movement sensing device, the processing unit is configured to detect a key insertion into a lock, or a key removal from a lock based on the signals received from said movement sensing device.

8 Claims, 12 Drawing Sheets

APPARATUS AND METHOD FOR ELECTRONIC DETECTION OF KEY INSERTION AND REMOVAL

RELATED APPLICATIONS

This application relates to a patent application U.S. Ser. No. 12/882,236 filed on Sep. 15, 2010, titled "AN APPARATUS AND METHOD FOR ELECTRONIC LOCK KEY INDICATOR" (hereinafter "lock tracking device application").

BACKGROUND

The present invention relates to tracking the status of a lock in general, and to providing an indication of key insertion into a lock.

Quite often, people forget whether they have locked the door in the house, office, or other premises, or not. As a common occurrence—someone may depart a building intending to secure it by externally locking a certain door using its corresponding key, upon departure. However, following his departure, he or she may be unable to recall whether or not they have actually locked the door, securing it by turning the corresponding key into a locked position. Hence, there is a need to provide a reliable, low-cost, convenient device which may be attached to the majority of portable keys, which device shall clearly indicate whether the lock corresponding to said key has been actuated into the lock position or not.

Several inventors have suggested various devices including attachments to standard keys, which would hopefully indicate the most recent lock position. However, most of these inventions rely on the user exerting a force on the attachment housing, using his fingers while turning the key in the clockwise or counter-clockwise direction. This force, or rotational torque, has been suggested to activate an array of mechanical and/or electronic switching devices which in turn were conceived as leading to the sought after locked indication. (See, for example, U.S. Pat. No. 4,440,011 by Klein, and/or US Patent Application 20090201151 of 13 Aug. 2009 by Yosef De Levie et al.) Certain inventions even indicated a specific location on said attachment in which the user's thumb and/or finger were to be positioned. Many keys are inserted into the lock in a horizontal position i.e. the key head is parallel to the floor, such that a thumb-activated switch may be difficult to achieve. Furthermore, occasional contact of keys including said attachments with various external objects, e.g.—coins or other objects in a user pockets, may reset the memory/indicator into an erroneous position. Moreover, several users may have different physiological structures of hands and fingers resulting in a great variety of forces being applied to the key while rotated inside the lock, which may lead to errors in the indicator output.

The lock tracking device application discloses a device for tracking the status of a lock. However, for efficient implementation that enables activation of the device upon a key insertion and deactivation upon a key removal there is a need to detect a key insertion/removal. The Lock tracking device application discloses one solution that may require a mechanical switch being attached to the device, pressed when the key is inserted and released when the key is removed. While this solution is simple and practical, it has some drawbacks, it requires an extra physical element that may suffer from problems of physical elements i.e. it may stuck especially in an environment that includes dust, sand etc. and it requires assembly of an extra moving element. The present disclosure describes a solution that does not require any additional physical elements and therefore is less prone to physical problems and is also cheaper for production.

BRIEF SUMMARY

The present invention enables a reliable electronic indication of the insertion of a standard key into its corresponding lock by sensing of motion parallel to the longitudinal axis of the key as modulated by protrusions and/or niches that are generally formed on the key.

The present invention enables to detect a key insertion into a lock and/or a key removal from a lock based on movement sensing device, such as, but not limited to an accelerometer. The present invention enables to detect a key insertion into a lock and/or a key removal from a lock according to signals that are generated by either an analog or a digital movement sensing device that is attached to the key.

An aspect of the disclosed subject matter relates to an apparatus and method for enabling detection of a key insertion into a lock or a key removal from a lock based on signals that are generated by an electronic movement sensing device that is attached to the key and generates signals that are responsive to protrusions and/or niches on the key. The signals that are generated by the movement sensing device are converted to digital pulses, the digital pulses are counted and detection of a key insertion/removal is determined based on predefined parameters of the digital pulses, wherein these parameters may be configurable or programmable in an exemplary embodiment in accordance with the disclosed subject matter there is provided an apparatus for detecting a key insertion into a lock or a key removal from the lock, comprising:

- a movement sensing device attached to the key configured to sense movement of the key; and
- processing unit configured to process signals received from said movement sensing device, the processing unit is configured to detect a key insertion into a lock, or a key removal from a lock based on the signals received from said movement sensing device.

In an exemplary embodiment in accordance with the disclosed subject matter the movement sensing device is at least one accelerometer.

In an exemplary embodiment in accordance with the disclosed subject matter the processing unit includes an electronic circuit for converting signals from the movement sensing device into digital pulses.

In an exemplary embodiment in accordance with the disclosed subject matter the digital pulses are generated when the signals from the movement sensing device exceed a predefined threshold level.

In an exemplary embodiment in accordance with the disclosed subject matter the accelerometer is a digital accelerometer which provides digital signals.

In an exemplary embodiment in accordance with the disclosed subject matter the processing unit includes a counter for counting the number of digital pulses within a predefined period.

In an exemplary embodiment in accordance with the disclosed subject matter detection of key insertion or a key removal is determined based on predefined parameters of the digital pulses.

In an exemplary embodiment in accordance with the disclosed subject matter the predefined parameters include the number of digital pulses within a predefined period.

In an exemplary embodiment in accordance with the disclosed subject matter the predefined parameters includes a maximal spacing between consecutive pulses.

In an exemplary embodiment in accordance with the disclosed subject matter differentiation between a key insertion or a key removal is achieved by detecting the phase difference between the corresponding sensed signals.

In an exemplary embodiment in accordance with the disclosed subject matter the predefined parameters are configurable.

In an exemplary embodiment in accordance with the disclosed subject matter the parameters are configured by a calibration process.

In an exemplary embodiment in accordance with the disclosed subject matter the parameters are configured by a calibration process initiated by a key insertion or a key removal is achieved.

In an exemplary embodiment in accordance with the disclosed subject matter there is provided a method for detecting a key insertion into a lock or a key removal from the lock, comprising:

attaching a movement sensing device to key;

processing signals that are received from said movement sensing device; and detecting a key insertion into a lock, or removal from a lock based on the processed signals received from said movement sensing device.

In an exemplary embodiment in accordance with the disclosed subject matter processing signals that are received from said movement sensing device includes conversion of signals from the movement sensing device into digital pulses.

In an exemplary embodiment in accordance with the disclosed subject matter processing signals that are received from said movement sensing device includes a counting the number of digital pulses within a predefined period.

In an exemplary embodiment in accordance with the disclosed subject matter detecting a key insertion into a lock, or removal from a lock is based on predefined parameters of the digital pulses.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

Figure 4A:
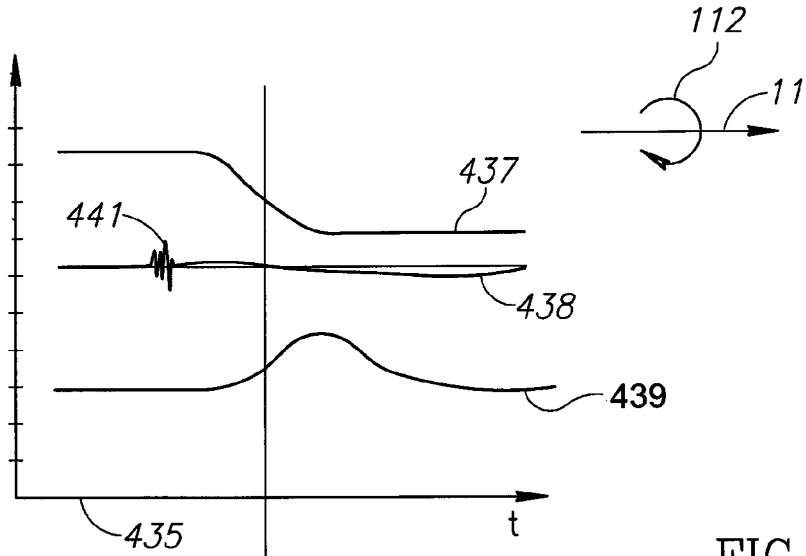
FIG. 4A shows the output electronic signals corresponding to a clockwise rotation about the longitudinal axis of the key.
Figure 4B:
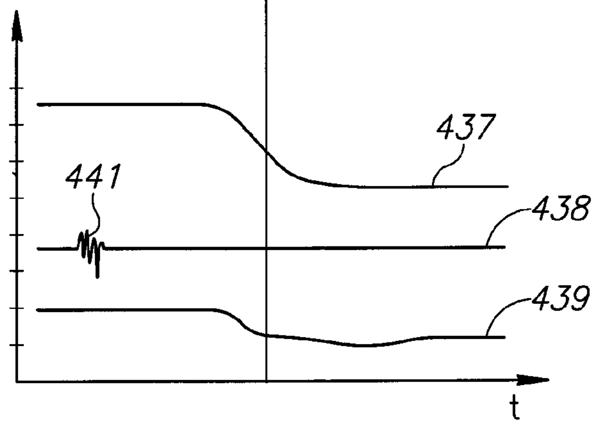
FIG. 4B shows the output electronic signals corresponding to a counter-clockwise rotation about the longitudinal axis of the key.
Figure 4C:
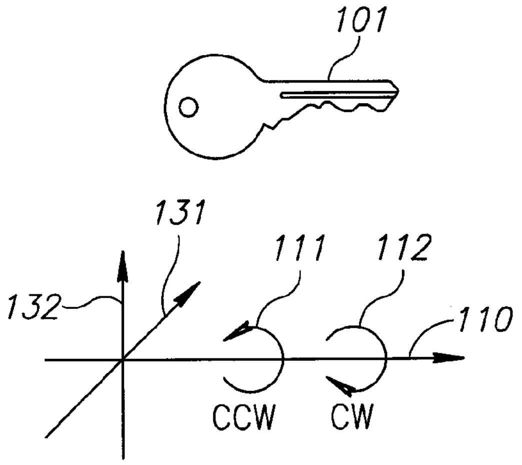

FIG. 4*c* illustrates the spatial orientation of a key, its longitudinal axis relative to the two other spatial axes and the rotational directions within this framework.

Figure 5:
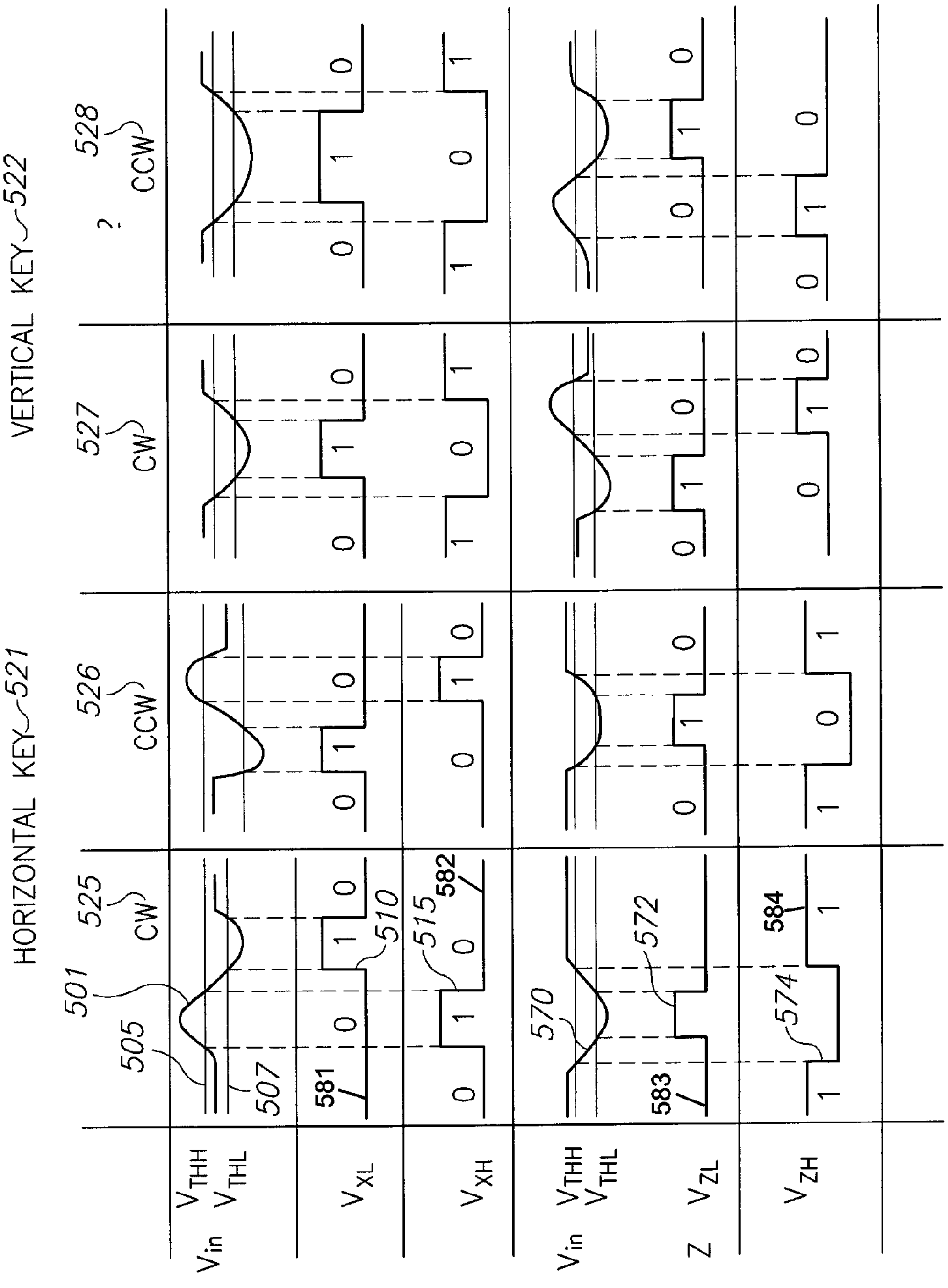

FIG. 5 illustrates the analog signals generated by the Accelerometer for a 360 degrees rotation of Keys and corresponding binary signals in accordance with the disclosed subject matter.

Figure 6:
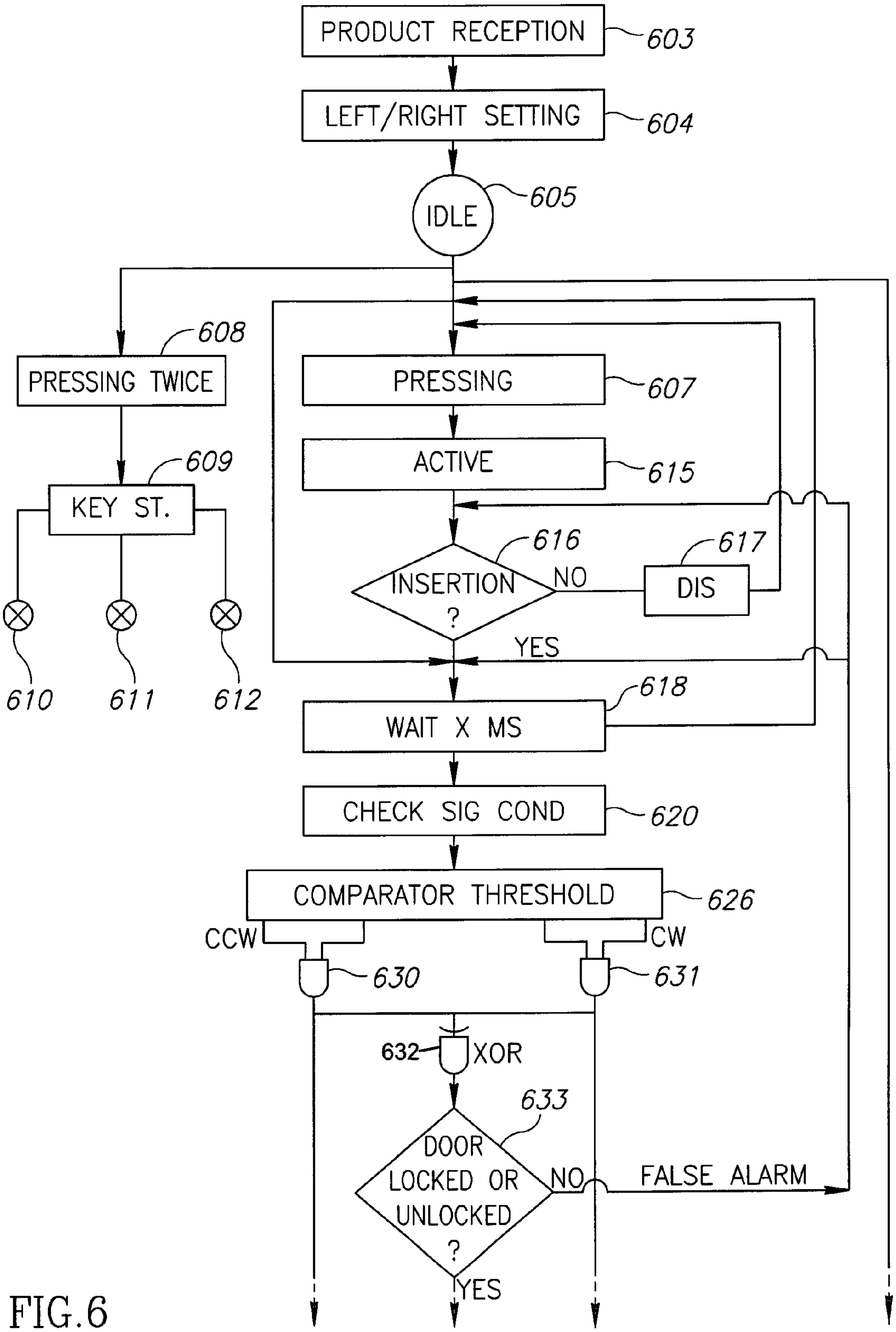
Figure 6:
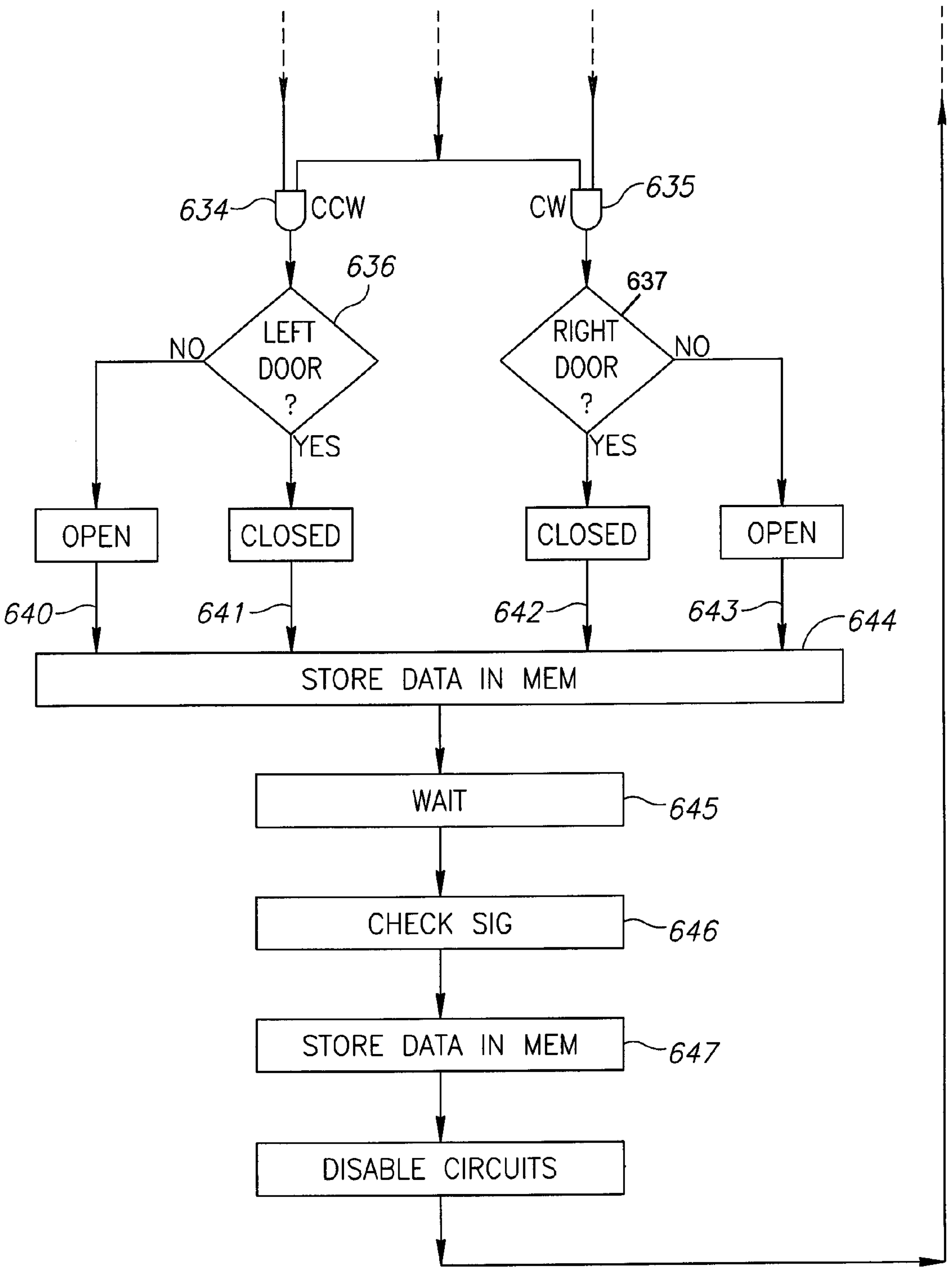

FIG. 6 presents an algorithm based on electronic detection of acceleration and illustrating the overall logical flow of information and decision points in one embodiment accordance with the disclosed subject matter.

Figure 7:
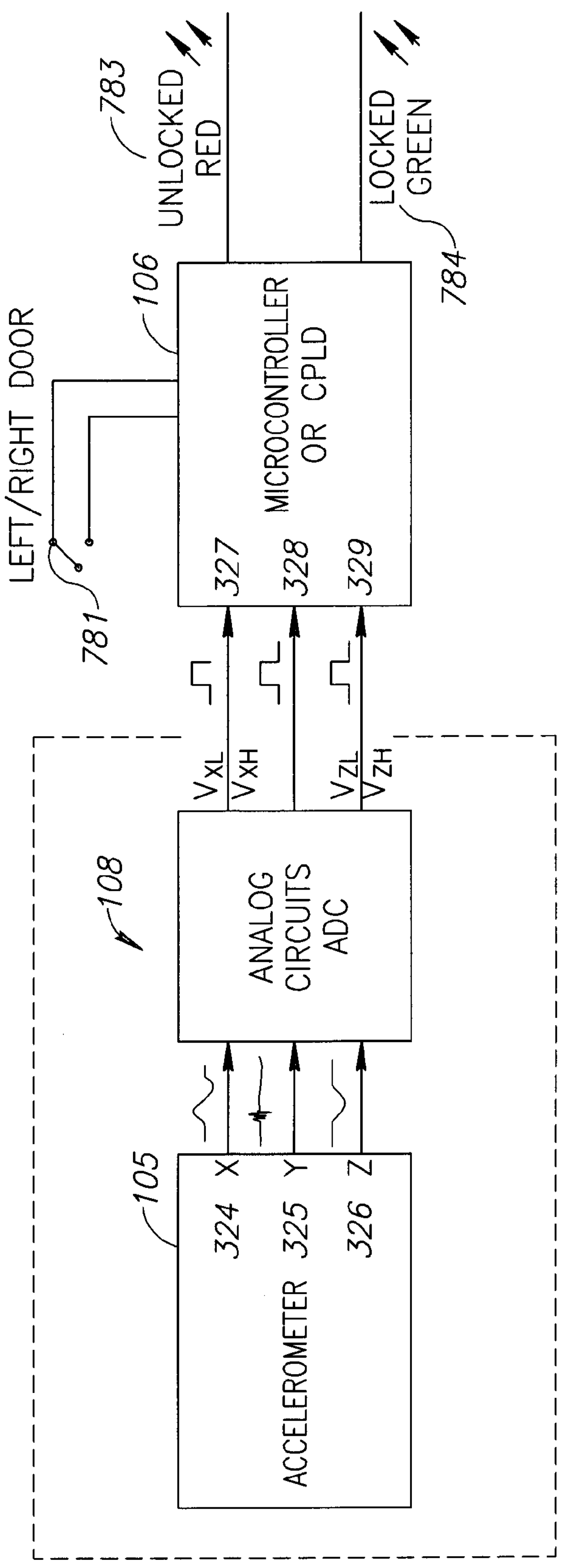

FIG. 7 depicts a general block diagram of the lock key indicator apparatus in accordance with the disclosed subject matter.

Figure 8A:
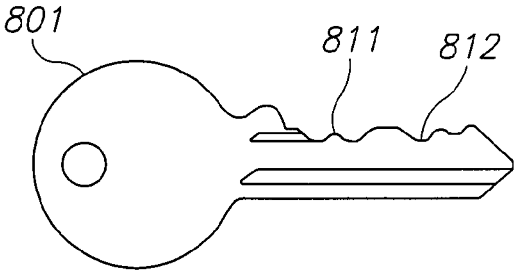
FIG.8A (PRIOR ART)
Figure 8B:
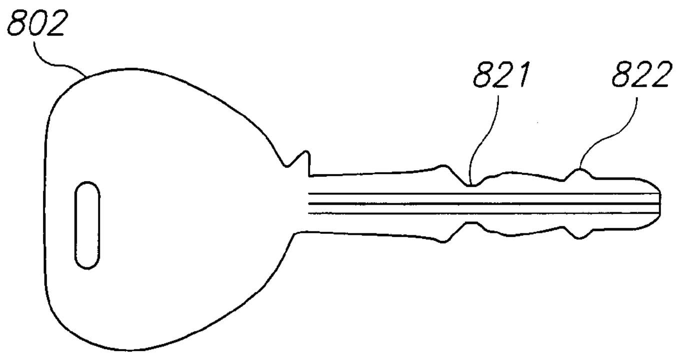
FIG.8B (PRIOR ART)
Figure 8C:
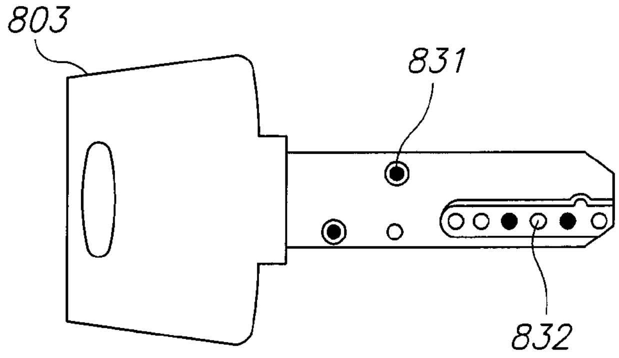
FIG.8C (PRIOR ART)

FIGS. 8A, 8B and 8C show some common key structures and their protrusions and niches. (Prior Art).

Figures 9A, 9B, 9C:
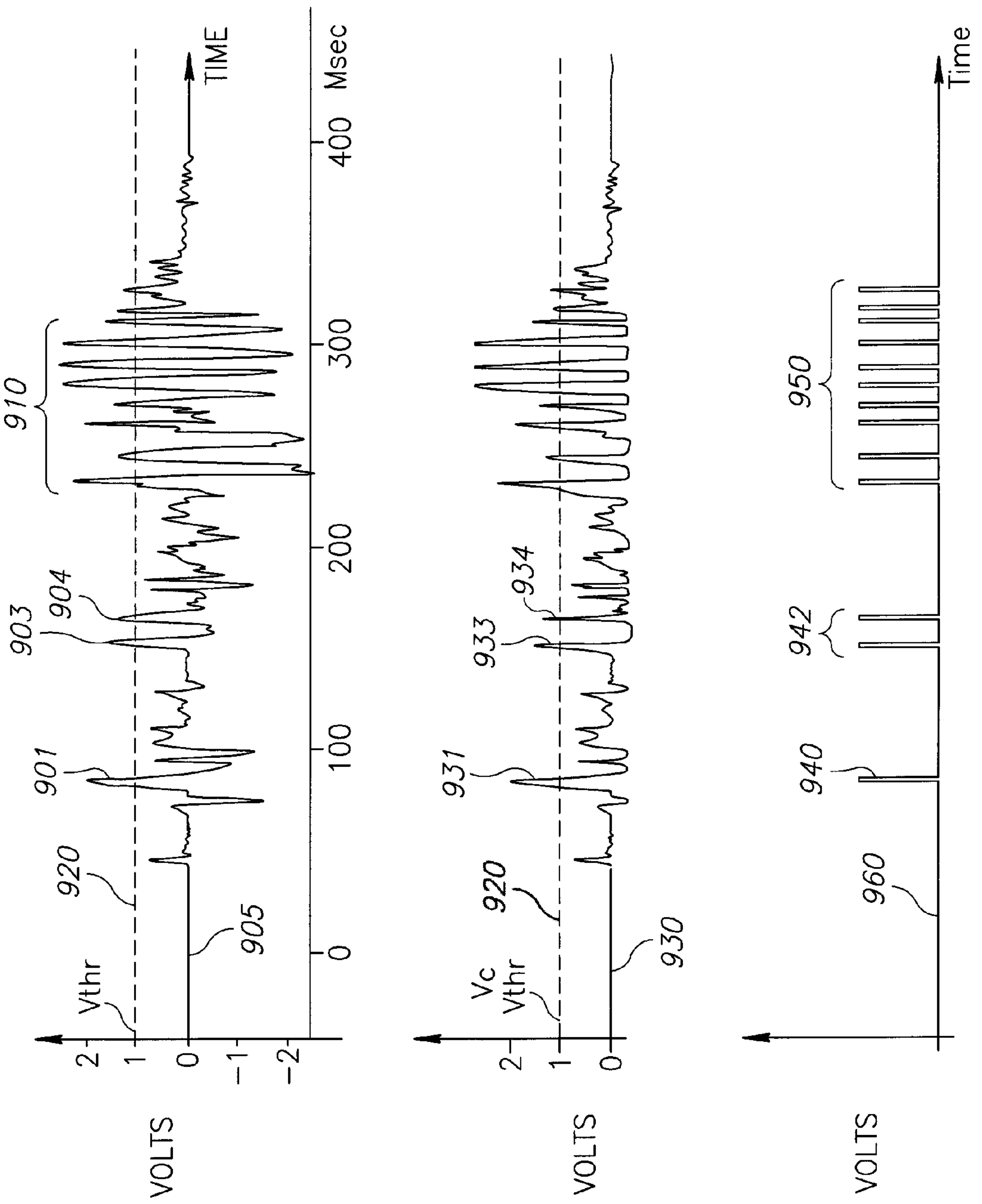

FIG. 9A shows a signal that is created by an acceleration sensing device that is attached to a key, following a key insertion or removal, in accordance with the disclosed subject matter.

FIG. 9B shows a signal that is created by a movement sensing device that is attached to a key, following a key insertion or removal, after removing the negative part of the signal.

FIG. 9C shows a sequence of pulses that are formed by processing a signal that is created by a movement sensing device that is attached to a key, following a key insertion or removal, in accordance with the disclosed subject matter.

Figure 10:
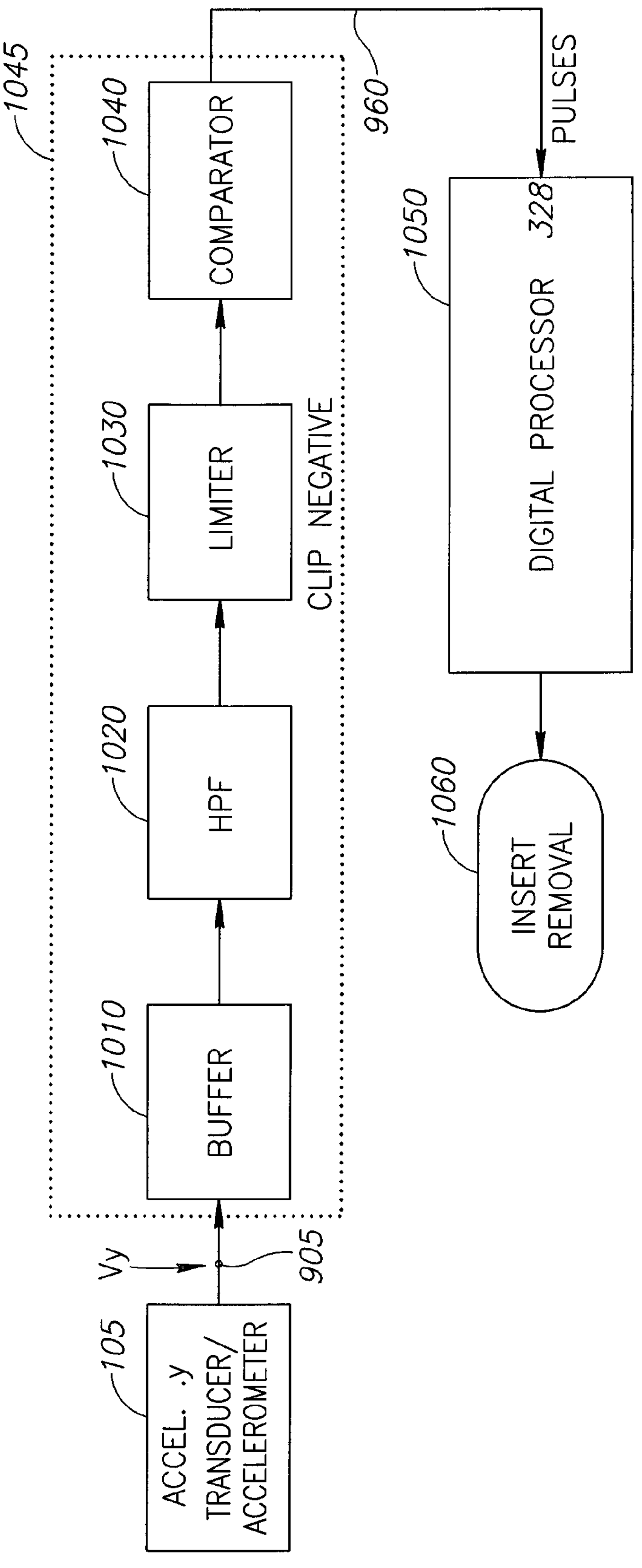

FIG. 10 describes a block diagram showing the stages of processing a signal that is created by a movement sensing device that is attached to a key, following a key insertion in order to define if a key was inserted from a lock, in accordance with the disclosed subject matter.

DETAILED DESCRIPTION

All technical terms used herein have the same meaning as commonly understood by one skilled in the art pertaining to the invention and in the art of electronics.

The disclosed subject matter is described below with reference to flowchart, illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, digital controller, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1A:
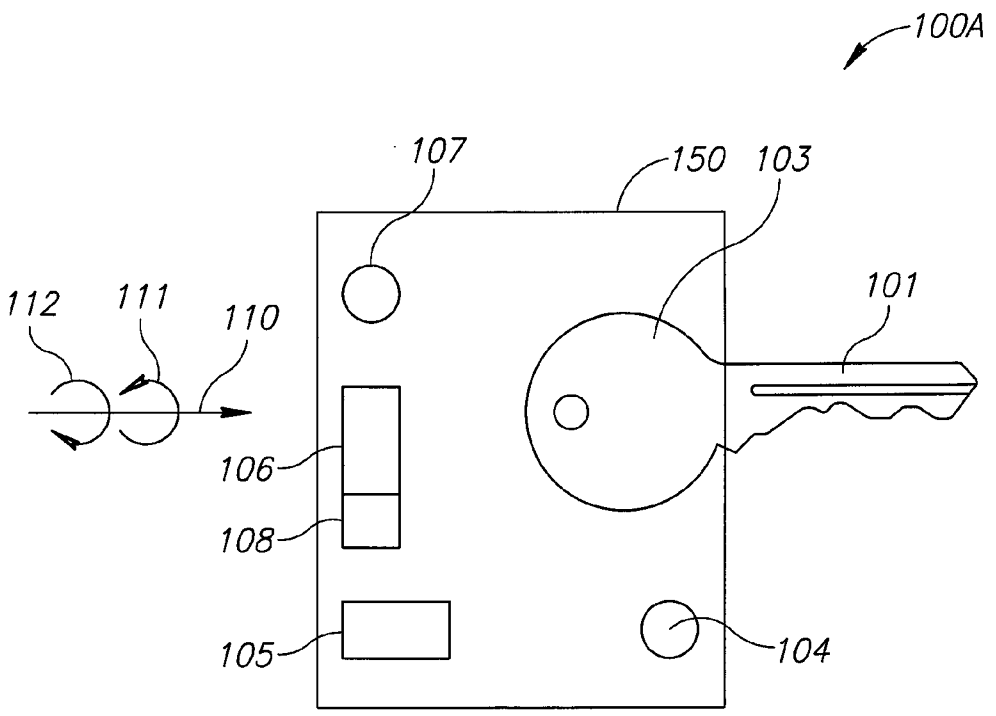
FIG. 1A illustrates a standard key inserted in a portable housing which includes the major electronic constituent components necessary for the implementation of this invention.
Figure 1B:
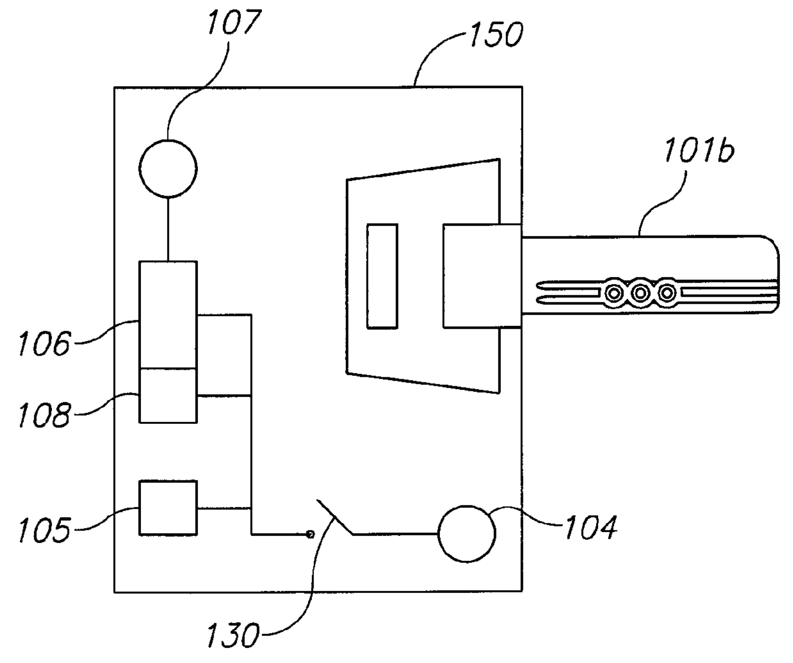
FIG. 1B illustrates yet another standard key inserted in the portable housing indicating the layout of the electronic components within the attached housing.
Figure 1C:
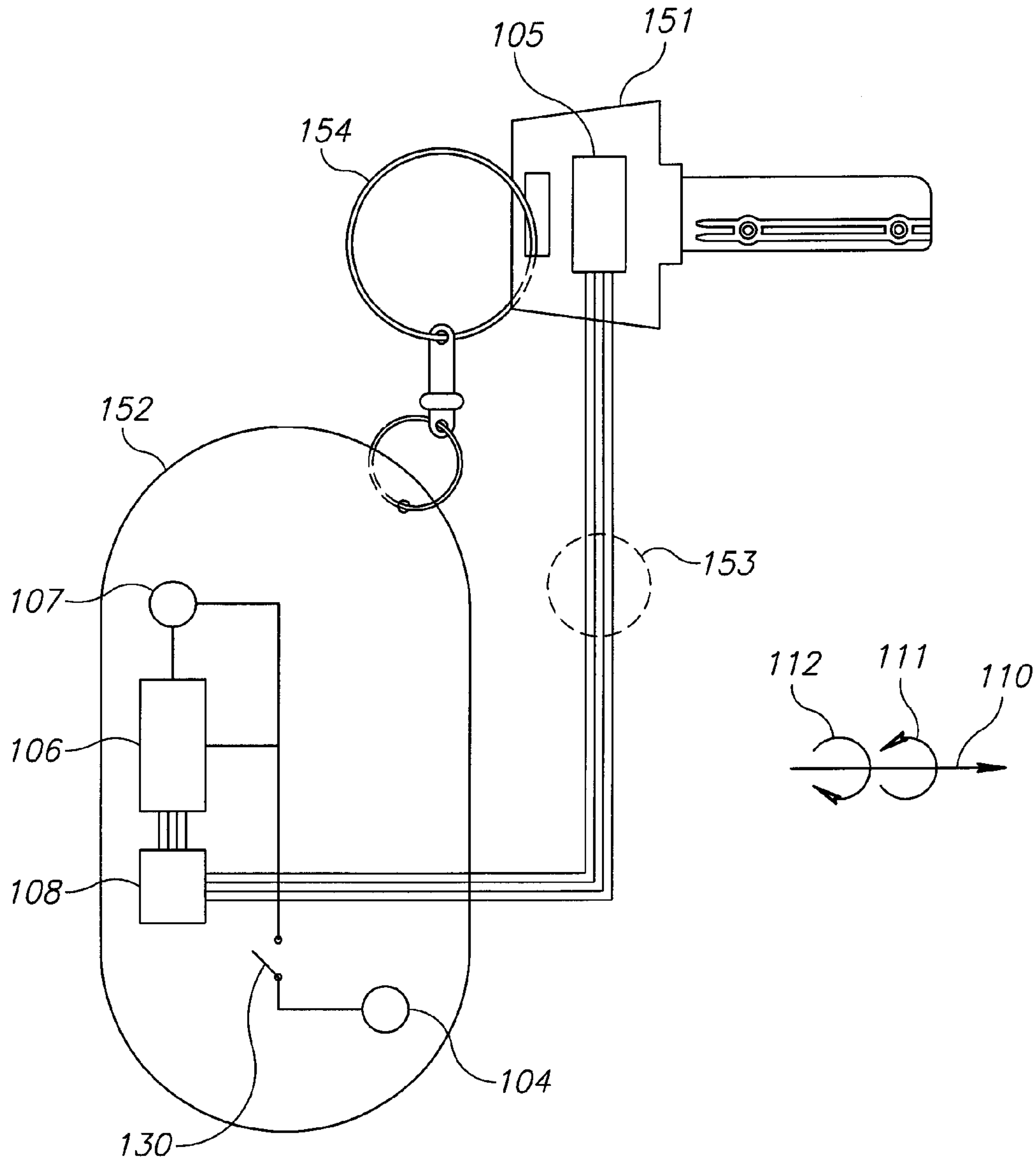
FIG. 1C shows yet another configuration deploying an additional external housing connected to the Key Head.

Referring now to FIGS. 1-10 in greater detail, FIG. 1 shows a key 101 having a head or handle 103 which head or handle is inserted into, or otherwise being attached to a key housing 150 such that the portion of the key to be inserted into the lock extends out of said housing. The electronic components used in this disclosure are included and interconnected among themselves within the housing 150 which can be mounted onto, or integrated within the key head, or attached to almost any type of key for indicating the most recent lock or unlock status of the lock operable by the key, by indicating the last direction of rotation about the key's longitudinal axis. FIG. 1A shows the housing 150 attached to one type of key 101, whereas another type of key 101*b* is depicted in FIG. 1B whose head is inserted in a similar housing; FIG. 1C shows an alternative housing, or Keyfob, 151 attached externally to the standard key-head. The housing 150 or alternative housing 151 may be manufactured using several well-known techniques such as injection molding techniques using various plastic materials.

FIG. 1A shows a movement sensing device 105 that is capable of detecting a motion in three dimensions. The movement sensing device 105 can be a sensor such as an accelerometer unit. The movement sensing device 105 may be a relative small-size (few millimeters) integrated circuit accelerometer (ICA). In one embodiment in accordance with the disclosed subject matter the movement sensing device output is an analog output and it is routed to an analog to digital (ADC) unit 108. The analog to digital (ADC) unit 108 output is connected to a digital electronic controller (hereinafter "controller") 106 that is processing the signals that are provided by the ADC and defines the lock's status, according to the key's 101 last rotation, either open or locked. Controller 106 controls indication unit 107 that provides a visual indication of the lock's status. Controller 106 can also be a microprocessor.

In an exemplary embodiment a green LED light indicates a locked status while a red LED light indicates an unlocked status. A battery 104 provides power supply to the abovementioned components.

In another embodiment in accordance with the disclosed subject matter, power supply from battery 104 is conditioned by power-save switch 130 that enables to save battery 104 power when either detection or indication may be suspended.

An alternate configuration is shown in FIG. 1C. Here, movement sensing device 105 is attached directly to a standard key-head or alternative housing 151, which is attached by rings (or any other connecting mechanism) 154 to an external housing (keyfob) 152 including the rest of the electronic components (such as analog to digital (ADC) unit 108, controller 106 etc.) described below in more detail. A compact cable, 153, carrying the electronic signals from movement sensing device 105 to the rest of the electronics as well as a connection to battery 104, is shown.

It should be noted that the present disclosure is not limited to any specific structure and connection scheme. FIGS. 1A, 1B and 1C are given by a way of a non-limiting example; actually the only physical constraint is that movement sensor device 105 must be physically attached to key 101 in order to enable the tracking of key 101 movements. It should further be noted that while the embodiments that are shown in FIGS. 1A-1C describe a specific structure/architecture, the same functionality may be achieved with alternative structure/architecture. For example movement sensing device 105 may be an integrated unit that includes also the functionality of analog unit 108. (The output of movement sensor device 105 provides digital signals directly to controller 106).

It should be further noted that movement sensing device 105 is a generic name that should be construed as any device that is adapted to provide information about a component that it is attached to, whether it is based on acceleration, motion, speed, placement or any information that enables to track the component motion, e.g. a gyroscope.

The direction of rotation of the key relative to the spatial orientation of the key and its related lock is indicated in all figures as follows: The longitudinal axis of the key, along which it is inserted into the lock, is defined herein as the Y axis, marked 110. A clockwise (CW) rotation of the key around its Y axis, looking in the direction of the arrow marked on Y, is marked 112, whereas a counter-clockwise rotation (CCW) of the same key is marked 111. The lock may be positioned within the X-Z plane which is usually perpendicular to the Y axis, with the Z axis, 132 (FIG. 4C), pointing up, perpendicular to Y, and the X axis, 131 (FIG. 4C), pointing into the plane of the paper on which the various figures are drawn and the X axis, 131, pointing into the plane of the paper on which FIGS. 1A, 1B and 1C are drawn.

In an exemplary embodiment When the user inserts the key 101 into the lock and rotates the key 101 about its longitudinal axis in a clockwise (CW), 112, or counterclockwise (CCW), 111, direction, which rotation causes the lock to correspondingly unlock or lock, the movement sensing device 105 (movement sensing device) attached to the key shall sense the insertion of as well as the direction of rotation (either CCW 111 or CW 112) of the key 101, thus indicating whether the lock was left in an unlocked or locked position (taking into account the kind of lock, either a right or a left oriented lock).

Sensing of the direction of rotation of the key is achieved independently of the user's positioning of his fingers and/or hand, and does not depend on users' fingers pressure on any switches or specific regions located on the attached device. Moreover, in order to sense the rotation of key 101, there is no need to use magnets and/or mechanical levers and/or switches. The particular manner that caused the rotation of the key and the particular positioning of the user's thumb and/or fingers on the attached housing of the tracking device according to the disclosed subject matter are substantially inconsequential insofar as the core of the disclosed subject matter is concerned.

According to the teachings of this disclosure, the indication of the direction of rotation of the key is achieved by means of electronic sensing using transducers and related electronic circuits that issue electronic signals the detection of which uniquely indicates a clockwise (CW), 112, or counterclockwise (CCW), 111, rotation of the key about its longitudinal axis, 110, independently of how said housing is being physically held by the user.

In one embodiment, said transducer may be a movement sensing device, 105, or more specifically an integrated-circuit accelerometer. The movement sensing device 105, available today, such as analog accelerometer Model number 7360 or digital accelerometer model 7361 manufactured by FREESCALE CORP, referred to as ICA, can be mounted inside the housing, 150, of the device attached to the key, 101, connected to a power-source such as a battery, 104, and electronic analog circuits including analog to digital (ADC) unit 108, feeding an electronic controller 106, which includes a memory, the output of which is fed into one or more electronic indicators, (indication unit) 107, which when activated, indicates the most recent status of the corresponding lock, i.e. whether it was left in locked or unlocked position. The movement sensing device 105, may consist of a capacitive sensing g-cell consisting of X-Y and a Z cells all within a single package, which is sealed hermetically at the wafer level. The g-cell is the sensing element of the system, which may consist of polysilicon mechanical structures. Acceleration is detected when a displacement in X, 131, Y, 110, or Z 132 (FIG. 4C) is detected in the g-cells. The displacement creates a change in capacitance. The ICA uses a switched capacitor technique to measure the g-cell capacitors thus the acceleration and related rotational data is extracted from a difference in the capacitance. As known in the professional literature, the g-cell is a mechanical structure formed from semiconductor materials (polysilicon) using semiconductor manufacturing processes.

Figure 2A:
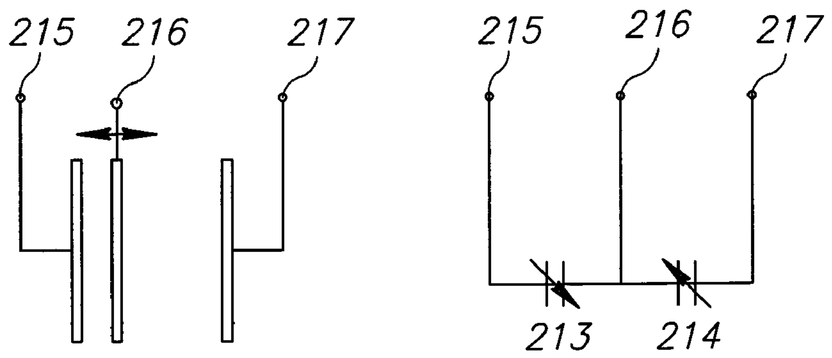
FIG.2A (Prior Art)
FIG. 2A illustrates the general relationship between the movement of the key and the electronic transducer deployed in this invention with reference to one axis (Prior Art).

In reference to FIG. 2A, it can be modeled as a set of beams, 215 and 217, positioned in proximity to a movable central mass, 216, that moves between beams 215, 217. The movable beam is deflected from its rest position when the apparatus is subjected to acceleration. As the beams are attached to the central mass move, the distance from them to the fixed beams 215, 217 on one side will increase by the same amount that the distance to the fixed beams 215, 217 on the other side decreases. The change in distance that is translated to a change of capacitance is a measure of acceleration. The g-cell beams form two back-to-back capacitors 213 and 214 (shown in FIG. 2A). As the center beam moves with acceleration, the distance between the beams changes and each capacitor's value will change following the equation $C=A\in/D$, where A is the area of the beam, $\in$ is the dielectric constant, and D is the distance between the beams.

Figure 2B:
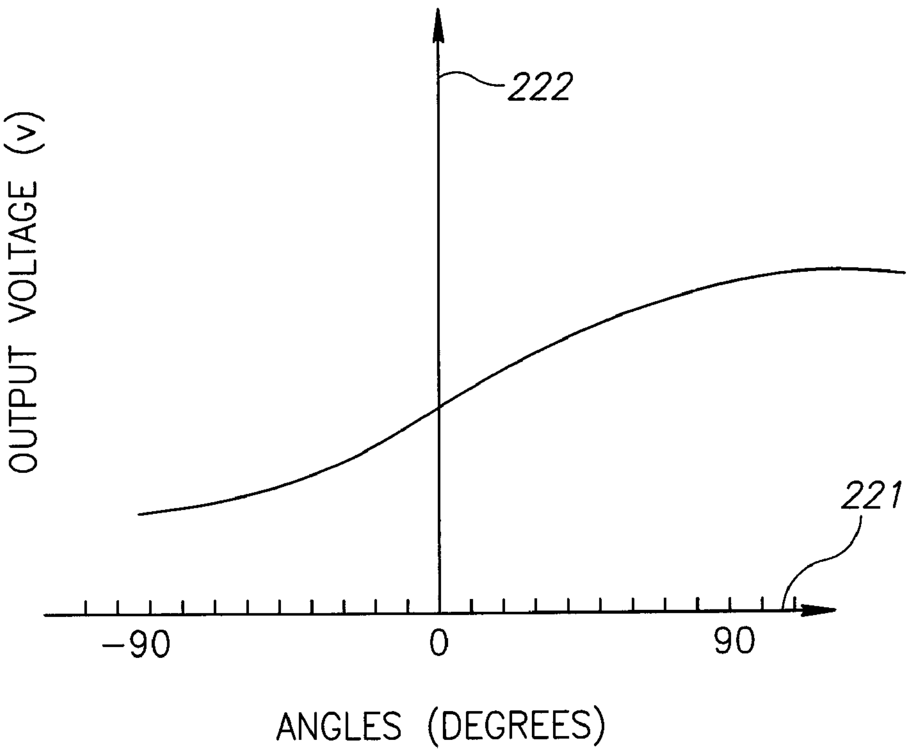
FIG. 2B illustrates the relationship between the magnitude of the electronic output signal of the transducer and the angle of rotation of the key with reference to one axis.

The movement sensing device 105 uses switched capacitor techniques to measure the g-cell capacitors and extract the acceleration data from the difference between the two capacitors, which are converted by the movement sensing device into a detectable voltage that is proportional to the acceleration. In one embodiment in accordance with the present disclosure, if a movement sensing device 105, is attached to key 101 as illustrated, the output voltage along certain axis is proportional to a rotation (which causes acceleration) as depicted in FIG. 2B, in which the magnitude of the output voltage, 222, along a certain axis shown as output voltage signal 439 (shown in FIGS. 4A and 4B), will increase as the Angle of rotation, 221, increases, while said output voltage will decrease as the Angle of rotation decreases.

Figure 3:
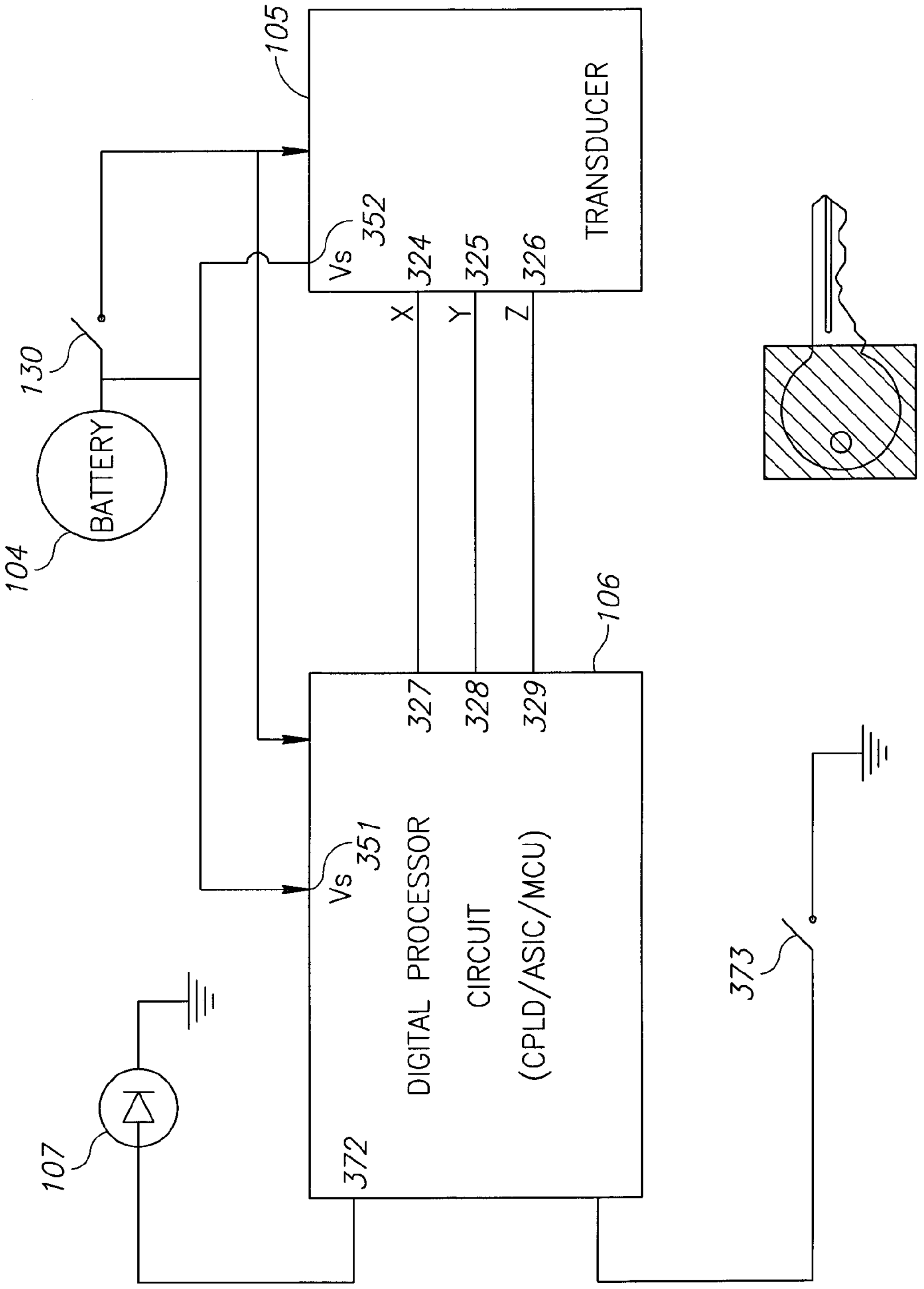
FIG. 3 is a block diagram of the electronic components and the interconnections between them according to one embodiment in accordance with the disclosed subject matter.

FIG. 3 is a block diagram of the electronic components and the interconnections between them according to one embodiment in accordance with the disclosed subject matter.

FIG. 3 shows the electronic components, corresponding to the ones shown packaged within housing 150 in FIG. 1, as they are generally interconnected so as to process the signals to result in a lock or unlock indication on indication unit 107. The movement sensing device 105, which may be an analog accelerometer followed by analog circuits as described below or a digital accelerometer, is feeding output signals 324, 325 and 326, corresponding to the X, Y and Z axes to corresponding input 327, 328, 329 of controller (processor) 106. Said controller 106 processes the digital signals and makes the decisions regarding the lock's status and provides the appropriate controls to indication unit 107.

In an exemplary embodiment in accordance with the disclosed subject matter. The movement sensing device 105, as well as controller 106, will be in its "sleep mode", in which they will draw minimum current from battery 104. Such sleep mode occurs when power-save switch 130 is open and in this state movement sensing device is powered by VS (standby voltage) 352 and the same voltage powers also controller 106 (351). Standby voltage is at a level that enables key insertion detection and optionally additional limited activities. When power-save switch 130 is closed by the user, activating detection of insertion of the key into the lock, movement sensing device 105 will respond to the insertion and rotation of the key feeding signals X, Y and Z marked 327, 328, and 329 into the digital processor (these signals are marked as 437, 438, and 439 in FIGS. 4A and 4B.

FIG. 3 further shows switch 373 which may comprise multiple functions. In one embodiment switch 373 may switch on/off battery power, either full power connect/disconnect or it may enable partial switching for example for standby/sleep mode power state. Switch 373 may be used for activating/deactivating indication unit 107. Switch 373 may also be used to initially program controller 106 to operate in a "left door" or "right door" mode. Switch 373 may further be used for manually providing a "key inserted" indication. The functionality of switch 373 may be programmed by the user as is customary in various commercially consumer devices.

In accordance with the example and spatial orientation depicted in FIG. 4A, when there is a signal, 441, indicating the insertion of a key, present on its input 328 controller 106 proceeds to look/wait for signals fed into its inputs 327 and 329. Upon detection of such signals, controller 106 will proceed to determine, based on the output of analog unit 108, if a CW 112, or CCW 111 rotation of the key was performed. Analog unit 108 may perform a comparison of the signals with threshold levels that are described hereinafter (with reference to FIG. 6) or by differentiation on its input signals, i.e. take the time derivative of the voltage signal—dv/dt—such that in case of a CW, 112, rotation it will feed a positive pulse into the controller, while in case of a CCW, 111, rotation it will feed a negative pulse into the controller at its input 329. Accordingly, controller 106 will perform an (Analog to Digital) ND conversion on these signals, process and store this information in its memory. Alternatively, if a digital accelerometer is used in 105, it will include all ADC circuits, such that no ADC components are needed in this case. Upon inquiry by a user enabling power-save switch 130, the controller 106 issues an enable or disable command, via its terminal 372, to indication unit 107, which may be a LED (Light Emitting Diode), or similar device, so that indication unit 107 will either light up or stay disabled, indicating a locked or unlocked status of the lock respectively.

It should be noted that the present disclosure is not limited to an implementation that utilizes a power-save micro-switch. Thus, controller 106 may be waiting for key rotation indication continuously.

In an exemplary embodiment according to the disclosed subject matter, the primary sensing of rotation of the key which is the fundamental mechanism used in this invention to indicate the lock or unlock status of the lock, is based on the output voltage of an accelerometer (Actually the movement sensing device 105 includes 3 units, for spatial movement sensing in three axes) which is proportional to said rotation.

FIG. 4A depicts the initial shape of the output voltages of the three axes, measured on an Oscilloscope in case of a CW rotation, following the insertion of a key into its corresponding lock, subsequently locking or unlocking the lock. In case of CW 112 rotation, initial output voltage signals 437, 438, 439 correspond to x-axis 131, y-axis 110, and z-axis 132 respectively, as illustrated on FIG. 4A and FIG. 4C. Output sensing signals can also be termed as sensing signals. In case of a CCW rotation 111, FIG. 4B illustrates initial output voltage signals 437, 438, 439 correspond again to axis 131, 110, and 132 respectively, the spatial orientation of key, 101, relative to the above axes is depicted in FIG. 4*c*.

With reference to FIG. 4A and FIG. 4B signal 441 appearing on axis 131, corresponding to sensing signal 438 as the key is inserted into the lock, irrespective of whether said insertion was followed by a CW, 112, or CCW, 111, rotation. This signal—identifying the insertion (or removal) of the key into the lock will be used, as explained later, to prevent false indications of lock status as well as to conserve Battery 104, energy. Comparing voltage signal 437 following the CW,

112, vs. the CCW, 111, rotation we note that in both cases the voltage was decreased from a higher level to a lower level. However, comparing output voltage signals 439 (the Z axis), there is a significant change in behavior: In case of a CW rotation, 112,—the voltage at 439 is increased following the initial rotation, while in the case of CCW, 111, rotation, the voltage is decreased. Hence, this disclosure introduces a unique method to distinguish between a locking and an unlocking operation of a key by means of sensing the output voltages of an electronic accelerometer, relying on the behavior described above: Sensing of two distinctly different output voltages—one increasing with CW rotation, vs. the other decreasing with CCW rotation of the key can be used as a means to sense and subsequently memorize and indicate the locked or unlocked status of the lock to which the key corresponds.

It should be noted that FIGS. 4A and 4B describe the initial signals (the complete signals are shown in FIG. 5) of one embodiment that is associated with a movement sensing device 105. However, when another type of movement sensing device 105 is used then the specific behavior of sensing signal 437,438, 439 (hereinafter "signals signature") may be different but there will still provide a signal signature that enables to differentiate between a CW rotation and a CCW rotation.

The Lock tracking device application referenced above describes in a general manner the possibility of detecting a key insertion or a key removal (hereinafter "a key insertion/removal") according to signals that are generated by a movement sensing device that measures movement (and most common acceleration) along the axis of the key when being inserted into a lock, such a signal was shown in FIG. 4 marked as 441. The present disclosure describes in a detailed manner the method and apparatus that enable the detection of key insertion/removal according to the characteristic of signal 441, without the usage of a mechanical switch.

FIGS. 8A, 8B and 8C describe three common general key structures 801,802 and 803. Each key includes a set of either protrusions or niches 811,812 in FIG. 8A, 821, 822 in FIG. 8B and 831, 832 in FIG. 8C that are formed on the part of the key that is inserted to the lock. These protrusions/niches are designed to guarantee that only a specific key will be able to lock/unlock the lock. When a key is inserted into the lock these protrusions/niches cause an interrupted pattern of motion. While a person applies a force when pushing a key into a lock, the varying mechanical protrusions or niches cause the resulting motion to be varied in proportion to said protrusions/niches. While a key, such as one of the devices described in FIG. 8, is inserted into its corresponding lock, protrusions 811, 812, or 821, 822, or 831, 832, will cause the electronic signal corresponding to the Y axis which is generated by Transducer 105 to be modulated in accordance with the specific shape of said protrusions. FIG. 9 depicts typical output electronic signals of an accelerometer/transducer described in this disclosure. As can be seen, the various peaks and valleys of the electronic signals correspond to the mechanical peaks and valleys of the protrusions on the keys.

A typical, empirical graph 905 that shows the output signal of an accelerometer that measured the acceleration pattern of a key being inserted into a lock, measured along Y axis (the direction of the key passage into the lock) is shown in FIG. 9A. In the case of key removal from the lock, a similar graph is obtained, however the peaks and valleys are interchanged, i.e.—in reference to FIG. 9A, the first cycle preceding 901 will be positive while 901 will be negative. Differentiation between a key insertion or a key removal is achieved by detecting the phase difference between the corresponding sensed signals.

In order to detect an insertion/removal of a key, the signal (such as shown in FIG. 9A) has to undergo a simple processing. The processing comprises two general stages. At the first stage analog signal 905 that is provided by the movement sensing device 105 has to be converted to digital pulses by an electronic circuit. The digital signal (digital pulses) can be processed by a controller 106. In another embodiment in accordance with the disclosed subject matter both stages are performed by a digital processing unit 1050 following digitization by a digital accelerometer unit, as described above.

In the first embodiment in accordance with the disclosed subject matter, the analog signal 905 provided by movement detection unit (accelerometer) 105 is passed through a buffer 1010 (FIG. 10) and a high pass filter (HPF) 1020. The buffer is used for impedance matching and the HPF is used in order to remove unwanted frequencies that are mainly noise. The signal then passes through a limiter 1030 that removes the negative component of the signal resulting with a signal 930 as shown in FIG. 9B. The signal is now being fed to a comparator 1040 that compares the signal 930 to a predefined threshold level $V_{THR}$ 920 resulting with a signal 960 (shown in FIG. 9C) which comprises digital pulses. Digital pulses are generated when signals 905 exceed a configurable threshold level 920. FIG. 9C shows a sequence of 13 pulses (marked as 940—one pulse, 942—two pulses and 950 ten pulses) along a time axis that represents a period of a length of an order of half a second. It is clearly noticeable that each of the pulses 950 corresponds to one of the analog pulses 910 (939) (and the same applies for 901 (931) 903 and 904 (933, 934)), respectively). Controller (or CPU/CPLD/micro-processor) 1050 (preferably included in controller 106) is provided with the sequence of pulses and is configured to determine if a given sequence of pulses indicates on a key insertion/removal event. In one embodiment of the present disclosure, the digital processor, alternatively referred to as controller 1050 counts the digital pulses with a counter and is running an algorithm that checks if a sequence of digital pulses fulfills conditions that are set by configurable and/or programmable parameters. Thus, detection of key insertion and a key removal is determined according to configurable predefined parameters of the digital pulses.

As mentioned before, the movement sensing device (accelerometer) 105 may provide a digital output. In this case the functionality of blocks 1010,1020, 1030 and 1040 (marked as 1045) can be performed by programming digital processor 1050 such as to perform the functions executed by said blocks.

In one embodiment in accordance with the disclosed subject matter the parameters include the number of digital pulses within a predefined period, the parameters may include additional optional parameters, such as a maximal spacing between consecutive digital pulses. The parameters may include a minimal number of digital pulses, as well as maximal number of pulses.

For example, processor 1050 may be configured to identify a key insertion or removal 1060 if a sequence of at least 12 pulses where detected within a period of two seconds. It is readily understood by a person skilled in the art, that controller 1050 may be programmed to make additional processing for adding more conditions. For example the processor may be configured to eliminate patterns that include a pause of more than half a second between consecutive pulses.

Furthermore, the apparatus in accordance with the disclosed subject matter can be configured to undergo a calibration process according to the decision of a user. While different keys have different types of protrusion/niches sets, that result with a different pattern of signal $V_Y$ 905, calibration mode may be initiated on the first usage of the key (or at any later occasion when the user find it appropriate). Calibration process enables the apparatus to optimize the process of key insertion/removal according to the actual parameters of a specific key, such as threshold level 920, the expected number of digital pulses, the gaps/spacing between pulses etc. It should be noted that some parameters may depend both on the key structure (811,821,831) and on the specific user—for example the gap between pulses depends on distance between protrusion/niches that are formed on the key, and also on the force that a user applies to the motion of key insertion/removal.

While the above description referred to a movement sensing device (most commonly used—accelerometer) that provides analog signals 905, the present disclosure is not limited to this architecture and it includes other movement sensing devices.

FIG. 5 illustrates the analog signals generated by the Accelerometer for a 360 degrees rotation of Keys and corresponding binary signals.

Two different key (actually dictated only by the lock orientation) orientations are depicted in FIG. 5. While in both cases the Y axis, 110, or the longitudinal Key axis is the same, the first case "Horizontal Key" 521, is oriented with its X-Y, 131-110, plane parallel to the ground, while in the second case "Vertical Key" 522, has its Y-Z, 110-132, plane perpendicular to the ground. Output signals of Accelerometer, 105, corresponding to key-rotations are portrayed as Vin for both the X, 131, and Z, 132, axes for complete full turns (360 degrees) in both the CW, 112, and CCW, 111, directions.

FIG. 5 describes all the four combinations of Horizontal/vertical key and CW/CCW, each one of the four combinations is described by six graphs: V in along X axis, Vin along Z axis—the voltages following digitization being provided by the accelerometer are marked: $V_{XL}$, $V_{XH}$, $V_{ZL}$ and $V_{ZH}$. While the methodology is equal for all four cases, the present description refers to CW Horizontal Key only.

When a horizontal key 521 is turned CW 525 the voltage Vin (along X axis) 501 that is provided by accelerometer 105 for the X axis is first increased and then decreases, reaching a minimum and returning to its original level (reference level). Vin 501 is compared to two threshold levels VTHH (Threshold High) 505 and VTHL (Threshold Low) 507. The comparison provides two digital signals—VXL 510 and VXH 515, wherein VXL is high whenever Vin (ALONG x AXIS) is below VTHL and VXH is high whenever VXin is greater than VTHH. The same applies for Z axis wherein VZin is marked 570, VZL 572 and VZH 574.

While the graphs that are shown in FIG. 5 describe empirical behavior of the voltages that are provided in all four cases (Horizontal CW 525, Horizontal CCW 526, Vertical CW 527 and vertical CCW 528), each of the four cases results with a unique sequence of zeros/low and ones/high (The uniqueness is achieved off course, if reference is made to the combination all four signals $W_{X/L}$, $V_{Z/L}$, $V_{Z/H}$ as each pair alone is not unique). It could be readily appreciated by a person skilled in the art that a simple processing of $V_{XL}$, $V_{XH}$, $V_{ZL}$ and $V_{ZH}$ enables to uniquely identify CW or CCW rotation of a key in either a horizontal or vertical key scenario. Each of the four cases: Horizontal key CW or CCW rotation and Vertical key CW or CCW rotation results with a unique pattern/sequence that is clearly distinguishable from other cases.

In a case of using a digital accelerometer, the output of said accelerometer is already in digital form and can be fed directly to the controller 106 for further processing, based on the criteria described above. E.g. the threshold voltage levels ($VTH_H$, $VTH_L$) can be programmed into the digital controller 106, and digitally compared to the digitized Vin signals.

An exemplary detection and lock-status—indication flow is described in a flowchart depicted in FIG. 6.

Upon apparatus reception (603) the user should configure the apparatus to either "Right Lock" or "Left Lock" according to the actual lock position (604). This setting is required because CW 112 key rotation locks a "Right Lock" door and unlocks a "Left Lock" door. ("Right Lock"/"Left Lock" is defined from the outside/outdoor side). The apparatus is now in an IDLE state (605) where in an exemplary embodiment it is activated by pressing a switch 373 (607). It should be noted that in other embodiments in accordance with the disclosed subject matter, the apparatus may be continuously active or activated by default wherein a switch pressing will move the apparatus from active state to IDLE state. However, while battery power is usually limited (due to the nature of the apparatus there is a need to limit battery size), it is expected to use means for reducing power consumption at least when the apparatus is not expected to be functioning for relatively long periods. Pressing the double-sided switch moves the apparatus to active state (615). In the active state the apparatus is programmed to detect a key insertion or removal (616). As shown in FIG. 4 the signal marked as 441 is an example of insertion/removal detection.

If in the active state (615) there is no indication on key insertion within a predetermined time-interval the apparatus disables all circuits and moves to IDLE state (617). If a key insertion is detected the apparatus opens a waiting period of a predetermined length of time (618) to check the signals condition in all three axis (620). If there is no positive indication on key rotation within a predetermined length of time (618) the apparatus returns to the IDLE state. It should be noted that if two consecutive key insertion signals are detected without any rotation signal detected in between said two consecutive insertion signals, the processor/controller will be programmed to identify the second signal as indicating a key-removal event and memorized by the processor/controller as such. Similarly, an insertion signal following a rotation signal will be detected as a removal event and memorized by the processor controller as such.

Positive indications on key rotation may result with CW rotation 112 (631) or CCW 111 rotation (630) depending on signals analysis. As was previously described with reference to FIG. 5, the signal that are provided by movement sensing device 105 reflect the movements of the key 101 relative to axes X and Z. Control unit 106 is adapted to identify CW or CCW rotation according to signal levels compared to the thresholds 626. Alternatively the signals from movement sensing device 105 can be analyzed by a differentiators circuit that checks dX/dt and dZ/dt (wherein X and Z are the voltage levels that are received from accelerometer 105).

A XOR (632) check is performed to eliminate false detection or proceed with CW or CCW key rotation (633). (If both CW rotation and CCW rotation are detected it definitely means a false detection occurrence) when a false detection occurs the apparatus returns to wait for signal condition check or to wait for insertion or removal state (616), depending on if it is still within a predefined period (618).

If a valid CW is detected (635) or a valid CCW (634) is detected then the apparatus needs to translate the rotation according to the Left/Right door setting (636, 637). The result may be one of four cases: Left door open (640), Left door closed (641), Right door open (643) Right door closed (642).

The result is stored in the apparatus memory (that is part of controller 106). The apparatus then waits for a predetermined time-interval (645) to look for an additional rotation. An additional rotation may be a second rotation similar to the just-identified rotation, in case that a lock can rotate twice, and it can be an opposite action, i.e. in case that a lock is opened right after being closed or vice versa—being locked right after being opened. If a lock can be rotated twice (or more) for double locking, it is also important to receive accurate indication about the amount of CW or CCW rotations, e.g. one CW rotation does not unlock a lock that was locked by two CCW rotations. After the data is stored in the apparatus memory 647 the apparatus goes back to IDLE state.

At any moment the user may press twice the double sided switches (608) and the current lock status (609) will be displayed by a colored LED indication door locked (610) green LED, door unlocked (611) red LED, or when the indicating unit 107 is IDLE the LED may be turned off (612).

Obviously, FIG. 6 describes one of many possible flows in accordance with the present disclosure. For example the indication unit may be designed in many other manners, the apparatus may not implement any power-save modes, thus—being continuously activated.

FIG. 7 depicts a general block diagram of the lock key indicator apparatus in accordance with the disclosed subject matter.

FIG. 7 shows the output signals 324, 325 and 326, (corresponding to X,Y and Z axes respectively) of the Accelerometer (movement sensing unit) 105, fed into the Analog circuits, analog unit 108, which in turn feed the generated binary signals 766, 767,768,769 and 770 into controller 106. Controller 106 may be implemented by a CPLD (Complex Programmable Logic Device), an FPGA, digital controller, or any other digital microprocessor. Said controller is initially set to a left or right door/lock by switch 781. The output of controller 106 will cause Red light—indicator, 783, to indicate an unlocked position, or a Green light—indicator, 784, to indicate a Locked position. As previously mentioned, analog unit 108 may be integrated within movement sensing unit 105, wherein in this case the outputs of movement sensing unit 105 are three digital signals It should be appreciated that the above described methods and apparatuses may be varied in many ways, including omitting or adding steps, changing the order of steps and the type of devices used. It should be appreciated that different features may be combined in different ways. In particular, not all the features shown above in a particular embodiment are necessary in every embodiment of the disclosed subject matter. Further combinations of the above features are also considered to be within the scope of some embodiments of the disclosed subject matter.

Section headings are provided for assistance in navigation and should not be considered as necessarily limiting the contents of the section.

It will be appreciated by persons skilled in the art that the present disclosure is not limited to what has been particularly shown and described hereinabove. Rather the scope of the present disclosure is defined only by the claims, which follow.

The invention claimed is:

1. An apparatus for detecting a key insertion into a lock or a key removal from the lock, comprising:

a movement sensing device attached to the key and configured to sense a translational movement of the key along the longitudinal axis of the key during the key movement in the lock by varying signals generated in time domain responsive to variations in the shape of the key as the key moves with translational motion in the lock; and a processing unit configured to process the varying signals, sensed by and received from said movement sensing device, by at least converting the variations of the signals to discrete digital pulses, wherein a key insertion or a key removal is determined based on at least one of configurable predefined parameters and programmable predefined parameters, the configurable and programmable parameters each comprising:

the number of pulses, the number of digital pulses within a predefined period, a predefined maximal spacing between consecutive pulses, or any combination thereof, and wherein a differentiation between a key insertion and a key removal is determined by at least one of: detecting the phase difference between the corresponding sensed signals, memorizing the last insertion event such that subsequent signals are identified as a removal event, and a combination thereof.

2. An apparatus according to claim 1, wherein the movement sensing device is at least one accelerometer.

3. An apparatus according to claim 1, wherein the processing unit includes an electronic circuit for converting signals from the movement sensing device into digital pulses.

4. An apparatus according to claim 1, wherein the digital pulses are generated when the signals from the movement sensing device exceed a predefined threshold level.

5. An apparatus according to claim 2 wherein the accelerometer is a digital accelerometer which provides digital signals.

6. An apparatus according to claim 1, wherein the predefined parameters are configured by a calibration process.

7. An apparatus according to claim 6, wherein the predefined parameters are configured by a calibration process initiated by a key insertion or a key removal.

8. A method for detecting a key insertion into a lock or a key removal from the lock, comprising:

moving the key in the lock along the longitudinal axis of the key, thereby generating signals in time domain responsive to variations in the shape of the key, during the key movement along the longitudinal axis, by a movement sensing device attached to the key;

converting the variations of the signals to discrete digital pulses;

determining a key insertion or a key removal based on at least one of a configurable and programmable parameter, the configurable and programmable parameters each comprising:

the number of pulses, the number of digital pulses within a predefined period, a predefined maximal spacing between consecutive pulses, or any combination thereof;

and wherein a differentiation between a key insertion and a key removal is determined by at least one of: detecting the phase difference between the corresponding sensed signals, memorizing the last insertion event such that subsequent signals are identified as a removal event, and a combination thereof.

* * * * *